US005625407A

United States Patent [19]
Biggs et al.

[11] Patent Number: 5,625,407
[45] Date of Patent: Apr. 29, 1997

[54] SEAMLESS MULTIMEDIA CONFERENCING SYSTEM USING AN ENHANCED MULTIPOINT CONTROL UNIT AND ENHANCED ENDPOINT DEVICES

[75] Inventors: John T. Biggs, Bricktown; Diane G. Landante, East Brunswick; Sandra C. Milstead, Clarksburg; Dale L. Skran, Marlboro; Arthur R. Snowdon, Tinton Falls, all of N.J.

[73] Assignee: Lucent Technologies Inc., Murray Hill, N.J.

[21] Appl. No.: 272,503

[22] Filed: Jul. 8, 1994

[51] Int. Cl.⁶ ............................. H04N 7/15; H04M 11/00
[52] U.S. Cl. .................... 348/16; 348/15; 379/202; 370/200
[58] Field of Search ................... 348/15, 14, 16; 379/96, 202, 203, 204, 205, 206; 370/62

[56] References Cited

U.S. PATENT DOCUMENTS

| | | | |
|---|---|---|---|
| 4,653,090 | 3/1987 | Hayden | 379/204 |
| 4,686,698 | 8/1987 | Tompkins et al. | 379/53 |
| 4,710,917 | 12/1987 | Tompkins et al. | 370/62 |
| 4,847,829 | 7/1989 | Tompkins et al. | 370/62 |
| 4,953,159 | 8/1990 | Hayden et al. | 370/62 |
| 5,014,267 | 5/1991 | Tompkins et al. | 370/62 |
| 5,065,392 | 11/1991 | Sibbitt et al. | 370/62 |
| 5,136,581 | 8/1992 | Muehrcke | 348/15 |
| 5,195,086 | 3/1993 | Baumgartner et al. | 370/62 |
| 5,323,445 | 6/1994 | Nakatsuka | 348/15 |
| 5,384,771 | 1/1995 | Isidoro et al. | 379/202 |
| 5,402,418 | 3/1995 | Shibata et al. | 348/15 |

OTHER PUBLICATIONS

Bellcore Generic Requirements, GR-1337-CORE, Issue 1, Sep. 1993.
ITU Document H.231 "Multipoint control Units for Audio-visual Systems Using Digital Channels up to 2Mbps", Mar. 1993.
ITU Documet H.243 "Procedures for Establishing Communication between Three or More Audiovisual Terminals Using Digital Channels up to 2Mbps", Mar. 1993.

*Primary Examiner*—Stella Woo
*Attorney, Agent, or Firm*—Steven R. Bartholomew

[57] ABSTRACT

Techniques are disclosed for controlling the communication of multimedia electronic signals representing audio, video, and/or data. These techniques operate in conjunction with a system including a network, a multimedia server (MMS) connected to the network, and a plurality of endpoint devices connected to the network. The network is comprised of communications links and switches adapted for selectively connecting and disconnecting the communications links. The endpoint devices are adapted for converting multimedia electronic signals into audio, video, and/or data. The MMS is equipped to control the network such that multimedia signals may be exchanged among a plurality of endpoint devices, thereby providing a multimedia conference.

7 Claims, 11 Drawing Sheets

FIG. 6

SEAMLESS MULTIMEDIA CONFERENCING SYSTEM USING AN ENHANCED MULTIPOINT CONTROL UNIT AND ENHANCED ENDPOINT DEVICES

BACKGROUND OF THE INVENTION

1. Field of the Invention

The present communications system relates in general to multimedia (audio, video, and/or data) conferencing techniques, and in particular to a multimedia bridging system which utilizes an improved multipoint control unit and improved endpoint devices to provide a variety of features in a manner that constitutes a considerable improvement over the current art.

2. Description of the Prior Art

In the field of multimedia communications, a "bridge" or "multipoint consol unit" (MCU) is a computer-controlled device which includes a multiplicity of communication ports which may be selectively interconnected in a variety of ways to provide communication among a group of endpoint devices. MCUs are often used to establish multi-party conference calls. The state-of-the-art MCU is described in ITU Document H.243, "Procedures for Establishing Communication Between Three or More Audiovisual Terminals Using Digital Channels up to 2 Mbps," March 1993, and in ITU Document H.231, "Multipoint Control Units for Audiovisual Systems Using Digital Channels up to 2 Mbps," March 1993.

Generally speaking, such systems require conferences to be prearranged in advance. A series of steps must be performed in order to provide the system topology necessary to implement a multimedia conference call. Typically, the user calls a reservation agent who then directs the MCU to either prepare itself to receive calls at a given time, or to dial out to the user at a given time. These setup procedures are inconvenient, tedious, and inflexible. A clear need exists to provide for "spontaneous" or "on-demand" conferencing where the user does not need to invoke a reservation system to set up a multimedia conference.

Bellcore Generic Requirements GR-1337-CORE, Issue 1, September 1993 contains a description of a "spontaneous" conferencing system based on user control from a touch-tone (DTMF) keypad, i.e., with strings of numbers and letters, and audio feedback from stored announcements. This method is widely used in the audio bridging industry for voice calls, and in the Bellcore GR-1337-CORE proposal, the same method is applied to multimedia calls (voice/video).

The method of spontaneous conferencing widely used for audio-only calls, and applied to multimedia calls in GR-1337-CORE, suffers from the following difficulties that represent areas of possible improvement:

1. The strings of numbers require a long period of time to enter. 2. The codes required to perform operations are numerous and difficult to remember. 3. Feedback is limited to audio messages, and the length of these messages is frequently such that the process of conference setup is very slow. 4. The user must make an initial decision to contact the MCU for the purpose of establishing a conference. 5. The MCU contacted via the method of GR-1337-CORE may have no available resources with which to implement a multimedia conference. 6. The user is highly aware of the "seams" (i.e., procedural discontinuities) in the process of constructing the conference. 7. The person initiating the addition of a new party to the conference may wish to have a private conversation with the new party prior to allowing this party into the conference. The purpose of this conference might be to confirm the identity of this new party while allowing the conference to continue. However, existing systems are not equipped to provide such a private conferencing mode. 8. The person initiating the conference might wish to select the conference mode of operation which, for example, determines the selection criteria to be applied in determining the party or parties which will be broadcast to other conference participants at any given moment in time. Typical conference modes include chair mode voice-activated mode, and various other modes known to those skilled in the art. It would be desirable to change this mode during the conference upon command, although such changes are difficult or impossible to implement with state-of-the-art systems.

U.S. Pat. No. 4,653,090, which is owned by the current applicant, describes a system of graphics-based call management which establishes a voice and/or data conference using a graphical user interface. U.S. Pat. No. 4,953,159 (also owned by the current applicant) describes an audio graphics conferencing arrangement controlled by a graphics user interface. In both of the aforementioned patents, graphics-based call management is limited to voice and data calls, and is not applied to video calls.

U.S. Pat. Nos. 5,014,267, 4,686,698, 4,847,829 and 4,710,917 describe a system of video conferencing terminals and a specialized network to support them. Such systems may provide some level of control over multi-media conference, but have the deficiency of requiring a special-purpose video network that may not be generally useful, and may be limited in physical size. Also, such systems only provide enhanced multi-media conferencing features to endpoints that are directly connected to the special-purpose network. In this context, such special-purpose networks can be regarded as one instantiation of the video equivalent of the audio PBX, or private branch exchange, providing special features to physically attached endpoint devices.

SUMMARY OF THE INVENTION

Techniques are disclosed for controlling the communication of multimedia electronic signals representing audio, video, and/or data. These techniques operate in conjunction with a system including a network, a multimedia server (MMS) connected to the network, and a plurality of endpoint devices connected to the network. The network is comprised of communications links and switches adapted for selectively connecting and disconnecting the communications links. The endpoint devices are adapted for converting multimedia electronic signals into audio, video, and/or data. The MMS is equipped to utilize the network such that multimedia signals may be exchanged among a plurality of endpoint devices, thereby providing a multimedia conference.

According to the techniques disclosed herein, at least one of the endpoint devices includes an endpoint communications link establishment device, an endpoint data transceiver, an endpoint processor, endpoint memory, and an endpoint user interface device which may include a keypad. The MMS includes a MMS communications link establishment device, a MMS data transceiver, a MMS processor, a MMS memory, and a multimedia signal routing device for selectively directing multimedia electronic signals to and from a plurality of endpoint devices. The network assigns the MMS a network address uniquely specifying a particular MMS. This network address is loaded into endpoint memory when the unit is initialized, or is otherwise required (e.g., if the address is changed).

Several novel methods are disclosed for implementing a multimedia conference. In connection with a first embodiment, a conference is initiated at a first endpoint device by uploading the network address from endpoint memory into the endpoint data transceiver. The endpoint communications link establishment device establishes a communications link between the first endpoint device and a second endpoint device through the network. The first endpoint device endpoint data transceiver transmits the network address to the second endpoint device endpoint data transceiver. The second endpoint device endpoint memory stores the network address. The first and second endpoint communications link establishment devices break the communications link between the first and second endpoint devices, and each of the communications link establishment devices establishes a new communications link between the respective endpoint device and the MMS through the network at the network address stored in endpoint memory. This procedure may be repeated using a third endpoint device in conjunction with either the first or second endpoint device to add additional endpoint devices to the conference. As the third or more endpoint is added, a privacy mode may be used. In this mode, the MMS allows a private conversation between the endpoint initiating the addition of the new endpoint and the endpoint being added, with the other endpoints (one or more) interacting only with themselves.

According to another preferred embodiment disclosed herein, the first endpoint communications link establishment device contacts the MMS, and then informs the MMS of one or more network addresses corresponding to endpoint devices which are or will be connected to the network. The MMS then provides a communications link between the endpoints by instructing the network to provide communications links between the aforementioned network addresses.

As a further alternative, the first endpoint communications link establishment device contacts the second endpoint communications link establishment device, and instructs the second endpoint processor to await a call from the MMS. The first endpoint communications link establishment device then drops the connection and calls the MMS, the first endpoint device data transceiver then sends the MMS the network address corresponding to the second endpoint device, and then requests that the first endpoint communications link establishment device call the second endpoint. In all of the above cases, procedural discontinuities are hidden from the user via the procedures and software described herein. In this manner, multimedia conferences are provided which are substantially procedurally continuous as perceived by system users.

BRIEF DESCRIPTION OF THE DRAWINGS

FIG. 6 is a hardware block diagram of a multimedia signal routing device for use in the MMS (102) of FIG. 1 that supports multimedia protocols where, for each endpoint device, all media (i.e., video, audio, data) are multiplexed onto a single communications link in the form of a connection between the endpoint and the MMS;

DETAILED DESCRIPTION

Figure 1:
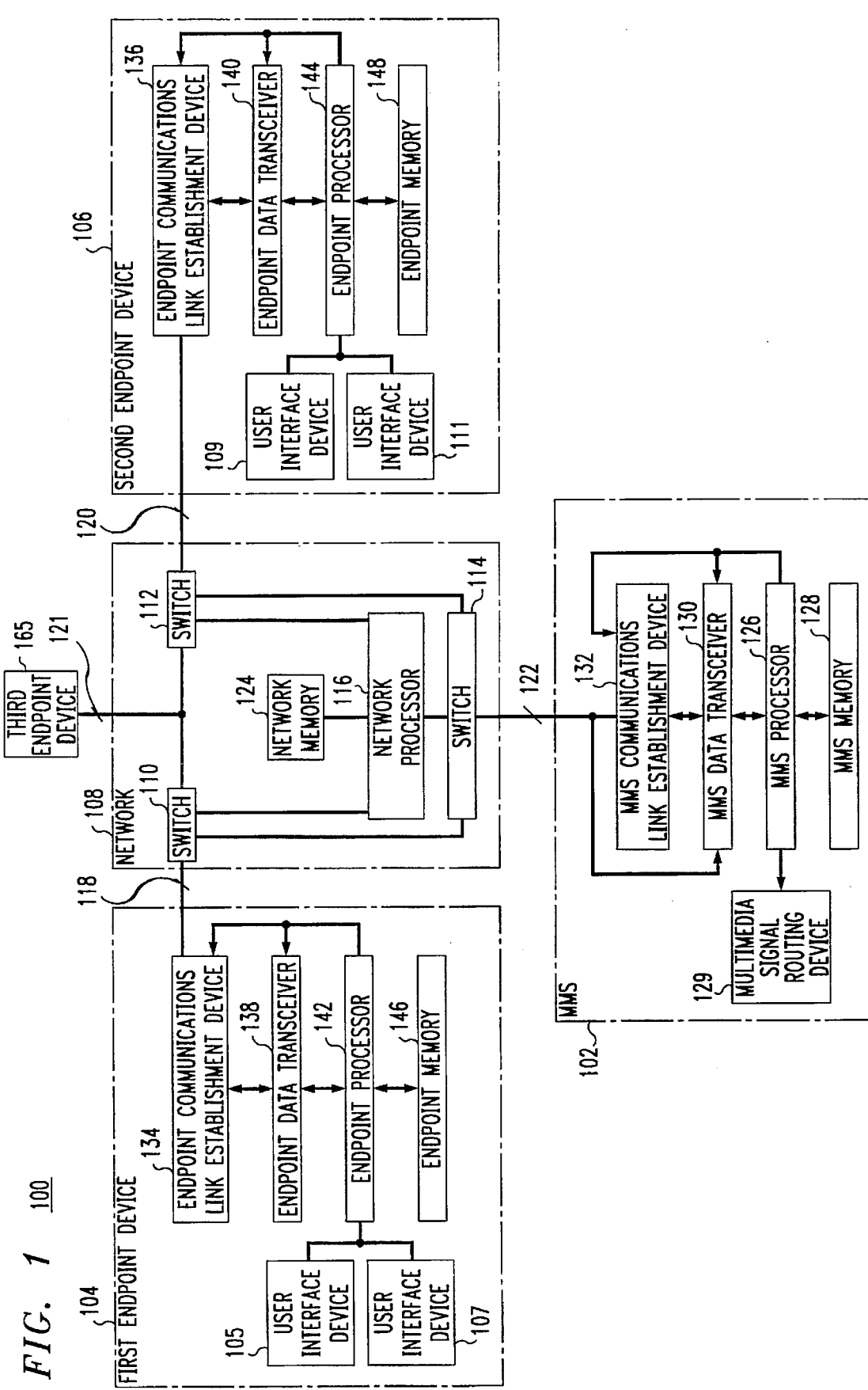
FIG. 1 is a block diagram setting forth the system architecture of a multimedia conferencing system which includes a MMS, a plurality of endpoint devices, and a communications network.

FIG. 1 is a block diagram setting forth the system architecture of a multimedia conferencing system 100 which includes an MMS 102, a plurality of endpoint devices 104, 106, and a network 108. Network 108 includes a plurality of switches 110, 112, 114 connected to a plurality of communications links 118, 120, 122, so as to provide selective interconnection of the communications links. Switches 110, 112, 114 are controlled by a network processor 116 coupled to network memory 124. Communications links 118, 120, 122 may be any known device or devices capable of transporting multimedia electronic signals from one location to another. Multimedia electronic signals are signals which represent data, video, and/or audio information. Examples of communications links 118, 120, 122 include conventional telephonic links, ISDN links, Ethernet connections, Asynchronous Transfer Mode (ATM) links, or the like. Network memory 124 may be any combination of read-only memory (ROM) and random-access memory (RAM). Suitable devices for use as network memory 124 are known to those skilled in the art. Network processor 116 may be a microprocessor of a type known to those skilled in the art. Switches 110, 112, and 114 are adapted for use in conjunction with the specific type or types of communications links 118, 120, 122 employed in the multimedia conferencing system 100. The selection of suitable devices for switches 110, 112, and 114 is a matter well-known to those skilled in the art.

Multimedia server (MMS) 102 provides for the communication of multimedia information among a plurality of endpoint devices 104, 106. The MMS 102 is connected to a plurality of endpoint devices 104, 106 via network 108 over communications link 122. The MMS 102 includes an MMS processor 126 connected to an MMS memory 128. MMS processor 126 controls the operation of an MMS data transceiver 130, an MMS communications link establishment device 132, and a multimedia signal routing device 129. Communications link establishment device 132 may be a conventional network interface device of a type well-known to those skilled in the art, such as T1, PRI, BRI, LAN, etc. MMS data transceiver 130 is frequently integrated with the network interface hardware, and MMS processor 126 may be a conventional microprocessor device. Communications link 122 could be a plurality of standard wire-pair telephonic links, and MMS memory 128 could be a combination of conventional ROM and RAM. Multimedia signal routing device 129 provides for the selective routing of video, audio, and/or data to and from a plurality of endpoint devices via network 108. The structure and operation of multimedia signal routing device 129 will be described in greater detail hereinafter with reference to FIGS. 5 and 6.

The devices disclosed in standards ITU-T H.231 and ITU-T H.243 MCU (multipoint control unit) are examples of suitable devices for use as MMS 102. However, other suitable devices for MMS 102 may be based on an existing protocol different from that utilized by the ITU-T H.243 and/or ITU-T H.231 MCU. For example, an MMS 102 may operate in such a manner that electronic signals representing each medium (i.e., video, audio, and data) are separated into their own virtual circuit comprising a media stream, such that a first media stream carries electronic signals representing video information, a second media stream carries electronic signals representing audio information, and a third media stream carries electronic signals representing data (i.e., FIG. 5, to be described hereinafter). Alternatively, MMS 102 may operate by multiplexing all media streams together into a single media stream (i.e., FIG. 6, to be described hereinafter). It is also possible to combine the two aforementioned media stream approaches, for example, by providing a data/control media stream separate from an audio/video media stream wherein video and audio signals are multiplexed together on a first media stream and data and control signals are multiplexed together on a second media stream. The term "enhanced MMS" is applicable to any MMS constructed in accordance with the principles of the invention disclosed herein.

As stated above, MMS 102 may be implemented using an MCU (such as is described in H.231/H.243). An MCU (multipoint control unit) may be defined as a device which supports the bridging of ITU-T H.320 protocols according to H.231/H.243. An MCU is considered to be a specific category of MMS.

A multimedia protocol is any protocol which allows the multiplexing of audio, video, and data together into a single stream adapted for transmission over a communications link. A multimedia protocol may alternatively separate video, audio, and data into three or more streams, where respective streams are accompanied by corresponding control messages. Typically, one or more codings are specified for audio, video, and/or data. The ITU-T H.320 protocol is an example of a standard multimedia protocol. Intel PCS (Personal Conferencing Specification) is another example, this time of a non-standard protocol. Both of the examples given involve the use of digital signals on circuit switched connections. Multimedia communications protocols might also operate over packet or cell connections. Also, analog technology might be used to multiplex Audio, Video and Data onto an analog signal using Frequency Division Multiplexing or other technology. The procedures of this invention apply without regard to the specific multimedia protocol being used, or the specific technology used for multimedia communications multiplexing.

First endpoint device 104 and second endpoint device 106 are coupled to MMS 102 via network 108. These endpoint devices 104, 106 include one or more user interface devices 105, 107, 109, 111. Each user interface device 105, 107, 109, 111 includes either an input means, an output means, or an input means combined with an output means. Output means are adapted to convert multimedia electronic signals representing audio, video, or data into actual audio, video, or data. Input means are adapted to accept audio, video, and data inputs, and to convert these inputs into electronic signals representing audio, video, or data. Examples of user interface devices 105, 107, 109, 111 include video displays, keyboards, microphones, speakers, video cameras, telephone keypad pads, or the like.

Endpoint devices 104, 106 are adapted to communicate using any of a number of existing multimedia communication protocols known to those skilled in the art. The endpoint device multimedia communication protocol controls the presentation of media streams (electronic signals representing audio, video, and/or data information) to the endpoint device user. Endpoint devices 104, 106 may function bidirectionally, both sending and receiving multimedia information, or, alternatively, endpoint devices may function unidirectionally, receiving but not sending multimedia information, or sending but not receiving multimedia information. Similarly, in a given multimedia system, some endpoint devices may be equipped to operate bidirectionally whereas other endpoint devices may be equipped to operate unidirectionally.

An example of a suitable endpoint device is an H.320 audiovisual terminal, but any device capable of terminating a digital multimedia stream and presenting it to the user constitutes an endpoint device for the purposes of this patent. A particular product example of an H.320 endpoint is the AT&T GIS Vistium. If the endpoint device is a "plain old telephone set" rather than a computer controlled general-purpose device, it cannot by its very nature participate fully in a multimedia conference. However, such an endpoint device could be used to generate electronic signals representing control information, i.e., a control stream, to an MMS via the use of DTMF signals. However, any conference setup and control using such a technology cannot, by its nature, be "seamless". However, many of the features described in this patent could be controlled from such a device.

Endpoint devices 104, 106 may utilize various existing signalling techniques and multimedia communication protocols for the purpose of communicating with other system components, such as other endpoint devices 104, 106, MMS 102 over network 108. Examples of such signalling techniques and multimedia communication protocols include BAS (AIM, AIA), MBE, NS-com, or the like. Definitions for these protocols and signalling schemes are as follows:

AIA

This is a Bit Rate Allocation Signal (BAS) code that is sent by an endpoint device conforming to the ITU-T H.243 MCU or the ITU-T H.320-standard for the purpose of indicating that audio is active as opposed to muted. This BAS code is defined in ITU-T recommendation H.230.

AIM

This is a Bit Rate Allocation Signal (BAS) code that is sent by an endpoint device conforming to the ITU-T H.243 MCU or the ITU-T H.320-standard for the purpose of indicating that audio is muted. This BAS code is defined in ITU-T recommendation H.230.

BAS Code

BAS (Bit Rate Allocation Signals) codes are control messages defined in the ITU-T H.221 recommendation and additionally defined in ITU-T H.230. Such codes are used to control the multimedia multiplex allocation for an ITU-T H.320-conformant endpoint, and to indicate status, such as whether the audio is muted (see AIM/AIA).

BAS DTMF

In the ITU-T H.230 standard, a method is described for encoding numbers into "BAS" (Bit rate Allocation Signals).

This method may be used to encode touch-tone key-presses instead of the existing DTMF method of sending sinusoidal tones through a conventional voice channel. Since DTMF in the voice channel is disruptive to the conference and is not very reliable, the "BAS DTMF" is the preferred method of simulating DTMF features on ITU-T H.320 equipment, such as ITU-T H.320-compatible endpoint device and/or MMS. This general approach could be used (although different in detail) with any multimedia protocol.

MBE

The Multi-Byte Extension (MBE) is a message type defined in the ITU-T H.221 standard to allow longer length messages than single BAS codes to be sent. The message can be up to 256 bytes in length. A preferred embodiment of the invention utilizes an improved MBE data structure, to be described hereinafter.

NS-command

Sometimes written NS-com, a Non-Standard Command is an multi-byte ITU-T H.320 control message defined in ITU-T recommendation H.221. The message contains a country code and manufacturer's id, allowing each manufacturer to add their own, non-standard messages.

According to a preferred embodiment disclosed herein, a new type of MBE (MultiBit Extension) message is used to send data representing the digits of one or more telephone numbers corresponding to endpoint devices to be added to a multimedia conference. The data structure for this "MBE NIA (Network Indicate Address) message," is: {start-MBE/ N/<nia>/n/dn,d(n–1)/../d2,d1/}
where N=number of bytes in the message <nia>=MBE_NIA n=number of channel (1 to XX) that the address is for d1=first digit to be dialed coded as a 4 bit binary number d2=second digit to be dialed, etc.

d(n–1)=second to last digit to be dialed dn=last digit to be dialed

There are N–2 groupings of packed digits (subtract 2 bytes for <nia> and n). If <dn,d(n–1)> equals 0×1 F, it is assumed that the NIA of the nth channel is the same as that of the (n–1)th channel.

In general, NIAs are sent with the least significant digit first, and it is not required to send the complete NIA. If a partial NIA is received, these digits will replace the least significant digits of the (n–1)th channel in forming the network address for the nth channel. This allows much time to be saved if all the NIAs differ by one or two digits.

All other communication (e.g., status messages, privacy indication, etc.) between the endpoint and MMS can be accomplished by using a message structure termed "NS-Com."

The structure for an NS-Com (Non-standard Command) message is: {NS-comm/N/country code/manufacturer code/ command}
where N=number of bytes in the message country code=country manufacturer code=manufacturer command=type of message (Privacy_on, Drop Party, Busy, etc.).

The term "mode" may be applied in the context of multiplexing multimedia signals on a communications link. In this context, "mode" refers to the combination of coding techniques used to encode/decode the media information and, if the coding technique is a frame-based one, the particular bit rate allocations being used. For example, in ITU-T H.320, a typical mode might include ITU-T G.711 audio, ITU-T H.261 video, and ITU-T 6.4 kbs low-speed data as described in ITU-T H.221.

Returning now to FIG. 1, the illustrative hardware embodiments set forth for the first and second endpoint devices 104, 106, respectively, will be described further. Each endpoint device 104, 106 includes an endpoint communications establishment device 134, 136, respectively, adapted for connection to a communications link 118, 120. The endpoint communications establishment devices 134, 136 may include one or more of the following devices: (a) conventional telephone line dial-out devices, (b) a local area network interface, or (c) various other types of multimedia hardware. The structure and operation of the aforementioned devices is a matter within the knowledge of those skilled in the art. Communications links 118, 120 may be conventional communications lines, such as copper wire pairs, fiber optic cable, ISDN lines, coaxial cable, or the like.

Endpoint communications establishment devices 134, 136 are coupled to respective endpoint data transceivers 138, 140 equipped to send and receive electronic signals representing data. The combination of endpoint communications establishment device 134 and endpoint data transceiver 138 may be implemented using any of a number of existing network interface devices of a type known to those skilled in the art. Similarly, the combination of endpoint communications link establishment device 136 and endpoint data transceiver 140 may be implemented using a modem.

Endpoint communications link establishment device 134 and endpoint data transceiver 138 are controlled by endpoint processor 142. Endpoint communications link establishment device 136 and endpoint data transceiver 140 are controlled by endpoint processor 144. Endpoint processors 142, 144 may be microprocessors of a type known to those skilled in the art. Processor 142 is coupled to endpoint memory 146 and processor 144 is coupled to endpoint memory 148. Endpoint memories 146 and 148 may be any combination of conventional RAM and ROM devices, the selection of which is a matter well-known to those skilled in the art.

The multimedia conferencing techniques disclosed herein provide for controlling the communication of multimedia electronic signals representing audio, video, and/or data. These techniques are operable in conjunction with the system shown in FIG. 1 and including network 108, multimedia server (MMS) 102 connected to network 108, and the plurality of endpoint devices 104, 106 connected to network 108. The network 108 is comprised of communications links 118, 120, 122 and switches 110, 112, 114 adapted for connecting and disconnecting the communications links 118, 120, 122. The endpoint devices 104, 106 are adapted for converting multimedia electronic signals into audio, video, and/or data. MMS 102 is equipped to establish network connections utilizing network 108 such that multimedia signals may be exchanged among a plurality of endpoint devices 104, 106, thereby providing a multimedia conference.

To summarize the techniques discussed in conjunction with FIG. 1, at least one of the endpoint devices 104 includes an endpoint communications link establishment device 136, an endpoint data transceiver 140, an endpoint processor 144, endpoint memory 148, and one or more user interface devices 105, 107. The MMS 102 includes an MMS communications link establishment device 132, an MMS data transceiver 130, an MMS processor 126, an MMS memory 128, and a multimedia signal routing device 129.

Several novel methods are disclosed for implementing a multimedia conference. The network 108 assigns the MMS 102 a network address uniquely specifying a particular MMS 102. For each endpoint device, one or more network addresses are loaded into endpoint memory 146, 148, for example, when the endpoint is initially installed using user interface device 107, 105, 109, 111. Each of the network addresses loaded into endpoint memory 146, 148 corresponds to a specific MMS 102. In connection with a first embodiment, a conference is initiated at a first endpoint device 104 by uploading the network address from endpoint memory 146 into the endpoint data transceiver 138. The endpoint communications link establishment device 134 establishes a communications link 118 between the first endpoint device 104 and the second endpoint device 106 through the network 108. The first endpoint device endpoint data transceiver 138 transmits the network address to the second endpoint device endpoint data transceiver 140, for example, using the message NIA. The second endpoint device endpoint memory 148 stores the network address. The first and second endpoint communications link establishment devices 134, 136 break the communications link 118, 120 between the first and second endpoint devices, and each of the communications link establishment devices establishes a new communications link 118, 122 and 120, 122, respectively, between the respective endpoint device 104, 106 and the MMS 102 through the network 108 at the network address stored in respective endpoint memory 146, 148. The multimedia signal routing device 129 in MMS 102 selectively routes multimedia electronic signals to and from the first and second endpoint devices, thereby implementing a multimedia conference. Either the first 104 or the second 106 endpoint device may chose to add a third endpoint (165). This endpoint may be added (1) without a privacy mode or (2) with the use of a privacy mode.

Non-privacy mode—Endpoint device 104 informs the MMS (102) of its desire to add a third party. The MMS responds by setting up a link 122/121 with the third endpoint 165. This endpoint is immediately added to the multimedia conference that includes endpoint 104, 106 via appropriate instructions to the multimedia signal routing device (129). At this point all three endpoints 104, 165, 106 are present in the same multimedia conference.

Privacy mode—Endpoint device 104 informs the MMS 102 of its desire to add a third party. This message to the MMS includes the network address of 165. The MMS establishes a connection 122/121 to endpoint 165. Using multimedia signal routing device 129, the MMS 102 establishes a private conversation between 165 and 104. Endpoint 106 is left in a separate conference. When endpoint 104 is satisfied that 165 is ready to join the conference, 104 sends a message to MMS 102 asking that the two conferences be joined. The MMS 102 then joins the two conferences together, with the result that 104, 165, and 106 are now in the same conference.

According to another preferred embodiment disclosed herein, the first endpoint communications link establishment device 134 contacts the MMS 102, and then informs the MMS 102 of one or more network addresses corresponding to endpoint devices 106 which are or will be connected to the network 108. The MMS 102 establishes a link 122/120 between itself and endpoint 106 using network 108. The MMS 102 then utilizes the multimedia signal routing device 129, as will be described in greater detail hereinafter with reference to FIG. 4, for selectively routing electronic multimedia signals to and from a plurality of endpoint devices. As a further alternative, the first endpoint communications link establishment device 134 contacts the second endpoint communications link establishment device 136 through communications links 118, 120 and network 108, and instructs the second endpoint processor 144 to await a call from the MMS 102 initiated by the MMS communications link establishment device 132 over communications link 120 and through the combination of network 108 and communications link 120 to second endpoint device 106. The first endpoint communications link establishment device 134 then drops the aforementioned contact through communications links 118, 120 and network 108, and calls the MMS 102. The first endpoint device data transceiver 138 then sends the MMS 102 the network address corresponding to the second endpoint device 106, and then requests that the first endpoint communications link establishment device 134 call the second endpoint device 106.

According to each of the embodiments described above, a multimedia conference may be implemented spontaneously, or from a point-to-point multimedia call, in a "seamless" manner, such that procedural discontinuities perceived by conference participants are minimized or eliminated. The "seamless" multimedia conferencing techniques disclosed herein have the following characteristics, which are applicable, for example, in the context of a transition from a point-to-point conference call (two-party) to a multipoint conference call (more than two parties).

Characteristics of "Seamless" Multimedia Conferencing

1. The users of endpoint devices in a point-to-point conference call do not perceive the dropping of a point-to-point connection between them, nor do users perceive the creation of a new multipoint connection to the MMS, although both users are aware that a multipoint conference call is being initiated. 2. The user of the endpoint device adding a third party to a conference is not explicitly aware of processes implemented by the MMS during the transition, nor is the user required to take special action at the time of the transition to enter numbers needed to reach the MMS, or otherwise interact directly with the MMS. All such interactions are automated by the preferred embodiment described herein, and are hidden from the user during the transitional period between a point-to-point conference call and a multipoint conference call. Accordingly, one or more MMS network addresses should be installed on each endpoint device as a one-time activity, for example, during installation of the enhanced software and hardware on the endpoint device. 3. The user of the endpoint device adding a third party is not aware of any contact with a reservation system, nor of any interactions with such a reservation system. (These reservation systems are commonly utilized in various prior-art conferencing devices which are well-known to those skilled in the art.) 4. In the event that more than one MMS is contacted while setting up a conference, this signifies that the initial MMS contacted was unable to complete the multipoint conference call, due to insufficient capacity, attributable, for example, to the number of circuits in the multimedia signal routing device 129 of the MMS 102. However, even though the initial unit lacks capacity to support the multipoint conference, the user is not aware of the involvement of more than one MMS in the operation.

To increase ease of use, the seamless conferencing system employs in-band signalling between endpoint devices 104, 106, MMS 102, and network 108. However, the in-band signaling capabilities of the multimedia protocol are extended beyond that of prior-art schemes to provide additional controls from the user to the MMS and to provide additional feedback from the MMS to the user. Controls from the user to the MMS include commands to dial another endpoint device, drop that endpoint device, and re-dial an endpoint device, among others. Feedback from the MMS to the user includes indications that the called telephone number corresponding to a given endpoint device 104, 106 is ringing, busy, answered, connected; or that there is insufficient capacity in the MMS 102 or the network 108 to complete the requested action. Software programs executed on the MMS processor 126 interpret the commands being sent from the user and translate them into actions, such as dialing out to another endpoint device. When appropriate, status indications are sent back to the user.

In accordance with a preferred embodiment disclosed herein, one or more endpoint devices 104, 106 are enhanced as follows: Software is loaded into endpoint device memory 146, 148, respectively, which allows the first endpoint 104 to inform the second endpoint 106 of the MMS 102 network addresses while presenting a seamless interface to the user. Software is loaded into endpoint device 106 which equips endpoint device 106 to accept network addresses for an MMS 102, drop a point-to-point connection between the second endpoint device 106 and another system component such as MMS 102 and/or endpoint device 104, and then connect to a multipoint MMS conference without providing apparent disruption to the user of the endpoint device 106.

In accordance with a preferred embodiment disclosed herein, the MMS 102 is enhanced as follows: The MMS is equipped with a data transceiver 130 for receiving requests for the creation of "progressive" or "spontaneous" conferences. The MMS 102 also includes an MMS communications link establishment device 132, for example, in the form of dial-out means for dialing out onto a telephone line when such an operation is requested by an endpoint device 104, 106, 165 in the conference for the purpose of incorporating an additional endpoint device or devices 104, 106, 165 into the conference. The MMS 102 includes private communications link means in the multimedia signal routing device 129 for providing a private conference between the endpoint device 104 initiating the dial-out and the endpoint device 165 to be incorporated into the conference, while continuing to maintain the original conference. This original conference takes place between endpoint device 104 and one or more additional endpoint devices. The MMS data transceiver 130 also includes means for receiving and relaying requests received from the initiating endpoint device 104 for a particular conference mode to the MMS processor 126.

Figure 2:
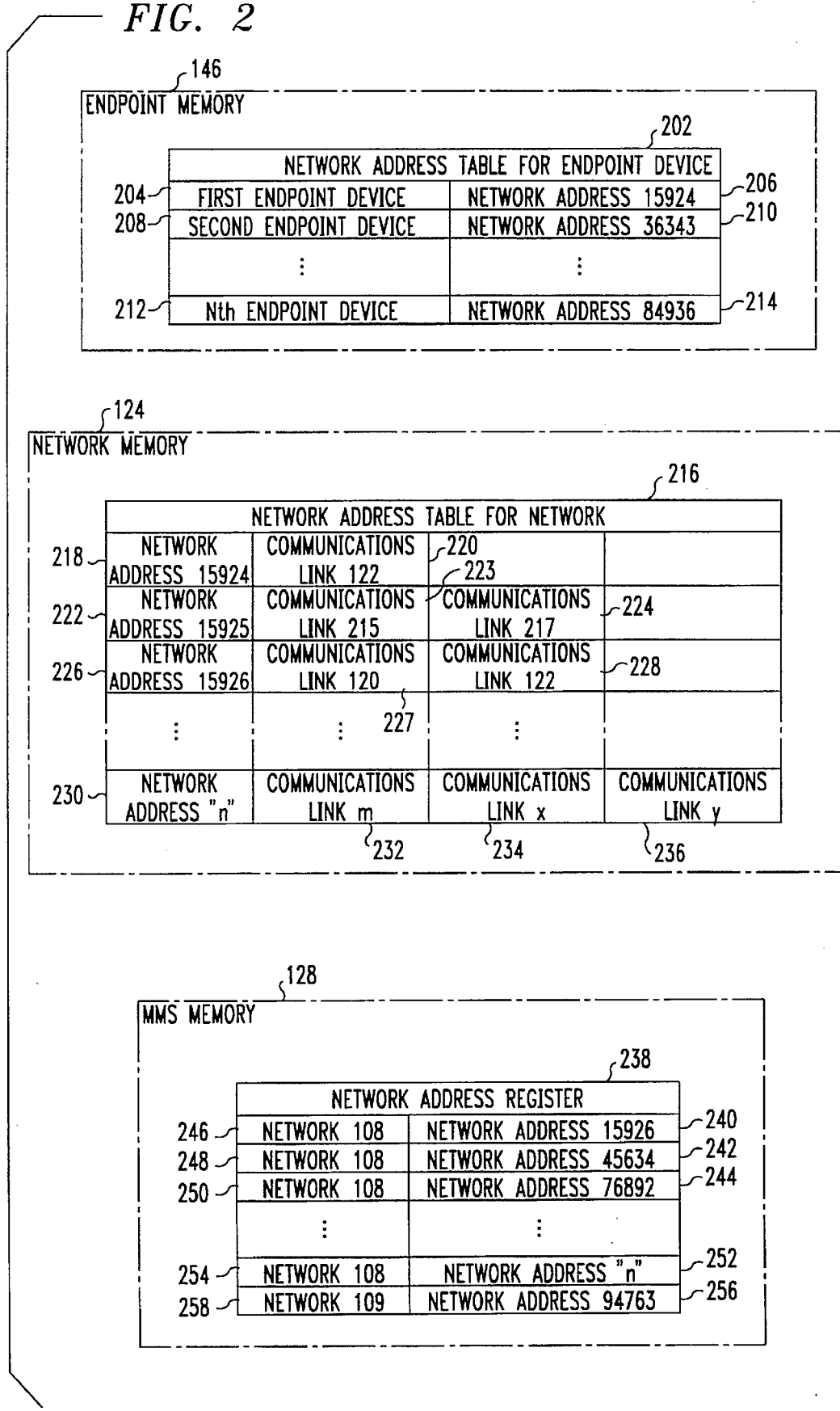
FIG. 2 sets forth the data structures utilized by the multimedia conferencing system of FIG. 1.

FIG. 2 sets forth the data structures utilized by the endpoint devices 104, 106, network 108, and MMS 102 of FIG. 1. Endpoint memory 146 is organized to contain one or more network address tables for endpoint device 202, and endpoint memory 148 is also organized in this manner. Each network address table for endpoint device 202 associates a given first endpoint device with a corresponding network address. For example, second endpoint device 204 specifies Conferee "A", and associates Conferee "A" with network address 15924 stored in network address field 206. Second endpoint device 208 specifies Conferee "B", and associates Conferee "B" with network address 36343 stored in network address field 210. The nth endpoint device 212 associates Conferee "n" with network address 84936 stored in field 214.

In one of the disclosed methods, endpoint 104 calls endpoint 106. As part of this process, endpoint memory 146 is updated to include the network address for endpoint 106. The network address for endpoint 104 is also stored, as this is passed to other endpoints on MMSs in some disclosed methods. As additional parties are added to the conference, the network addresses entered via the user interface of the convening terminal, for example 104, are placed in the memory 146 to associate an nth endpoint with an nth network address.

Note that (not shown) the endpoint memory also contains a similar table associating MMS1 (e.g., 102) with a network address, MMS2 with a network address, etc. This table is downloaded, for example, when the equipment is installed, or when a new MMS is installed. MMS network addresses are entered via the user interface.

Network memory 124 is organized to include one or more network address tables for network 216. Each of these network address tables for network 216 associates a given network address with a corresponding list of one or more communications links. For example, network address 15924 stored in field 218 is associated with communications link 122 stored in field 220. Network address 15925 stored in field 222 is associated with communications links 215 and 217, stored in fields 223 and 224, respectively. Network address 15926 (field 226) is associated with communications links 120 and 122 (fields 227 and 228, respectively). Network address "n" (field 230) is associated with three communications links, referred to as "m", "x", and "y", and stored in fields 232, 234, and 236, respectively.

MMS memory 128 contains one or more network address registers 238. Each network address register 238 associates a given network with a given network address. For example, network 108 (fields 246, 248, 250, and 252) is associated with network addresses 15926, 45634, 76892, and n (fields 240, 242, 244, and 252, respectively). Network 109 (field 258) is associated with network address 94763 (field 256).

Figure 3:
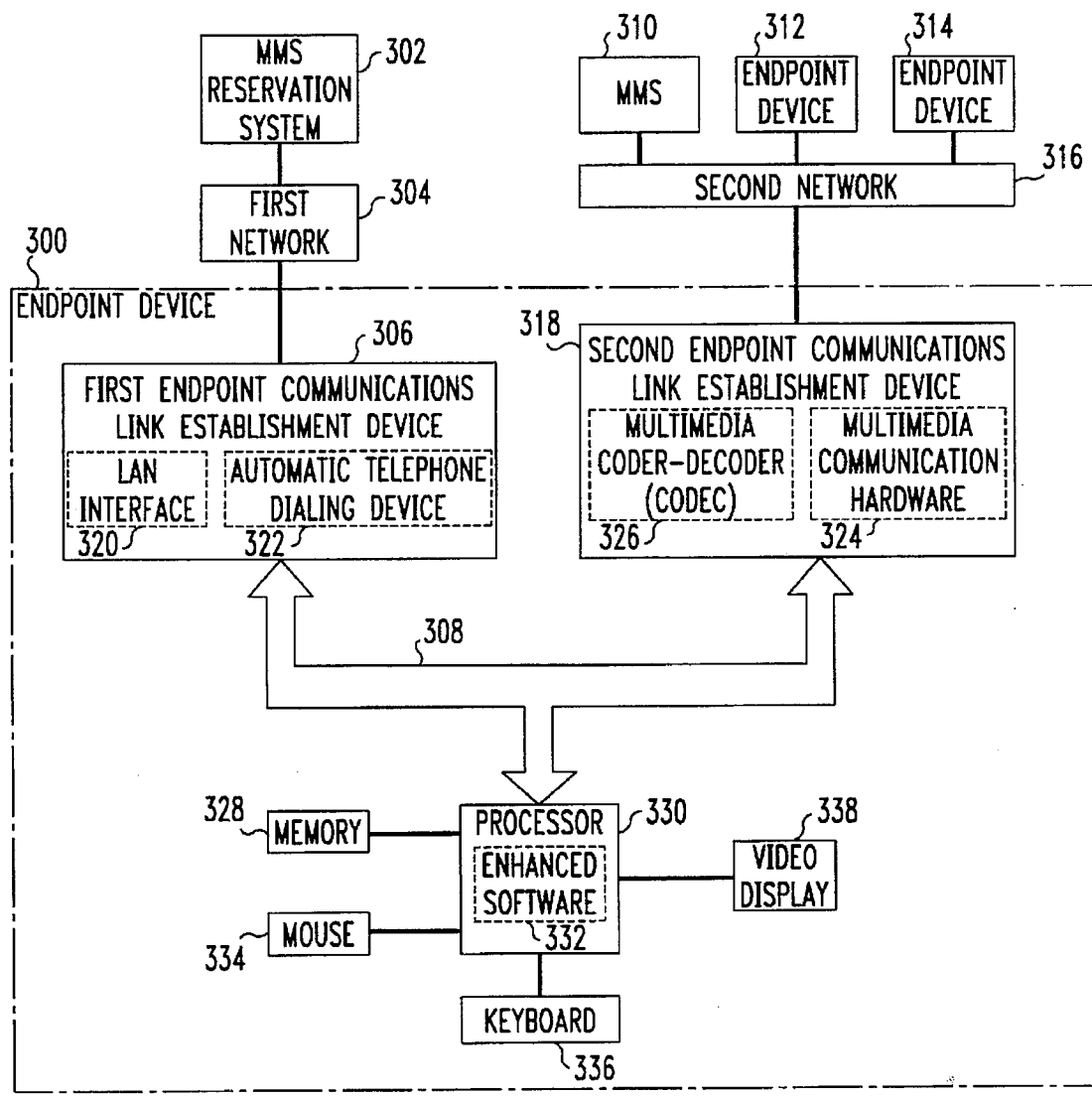
FIG. 3 is a hardware block diagram setting forth the hardware configuration for a preferred embodiment of an endpoint device which includes a personal computer.

FIG. 3 sets forth a hardware configuration for an exemplary endpoint device 300 constructed according to a preferred embodiment disclosed herein. In this example, endpoint device 300 is coupled to a first network 304 and a second network 316. First network 304 provides a connection to an MMS reservation system 302, and second network 316 provides connections to an MMS 310, endpoint device 312, and endpoint device 314. (Note that first network 304 and second network 316 could, but need not, be the same network.) In the configuration of FIG. 1, endpoint device 300 may be incorporated into the multimedia conferencing system as endpoint device 104 and/or endpoint device 106. Alternatively, other types of endpoint devices may be used for endpoint devices 104, 106.

Endpoint device 300 is based upon a personal computer. A first endpoint communications link establishment device 306 includes a LAN interface 320 and/or an automatic telephone dialing device 322. The first network 304 interfaces with the first endpoint communications link establishment device 306. A second endpoint communications link establishment device 318 includes a multimedia coder/decoder (CODEC) 326, and/or multimedia communication hardware 324. The second endpoint communications link establishment means 318 interfaces with the second network 316.

First and second endpoint communications link establishment devices 306, 318 are coupled to a standard PC bus 308 of a type well-known to those skilled in the art, such as an ISA bus. PC bus 308 interfaces with a processor 330, which may be a standard microprocessor known to those skilled in the art. The processor 330 is coupled to a memory 328. Enhanced software 332 is stored in the processor 330 and/or the memory 328. This enhanced software 332 implements the procedures set forth in FIGS. 7, 8, and 9, to be described in greater detail hereinafter.

Processor 330 interfaces with a plurality of peripheral devices such as a mouse 334, a keyboard 336 and a video display 338. Mouse 334, keyboard 336, and video display 338 are all standard items known to those skilled in the art. In this manner, endpoint device 300 is equipped to communicate multimedia information such as data and video.

Although the best service is obtained when all endpoint devices 104, 106 participating in the conference are "enhanced," endpoint devices which present a seamless interface to the user, enhanced operation in accordance with a preferred embodiment disclosed herein may be obtained if only one enhanced endpoint device 104 (i.e., an initiating endpoint device for initiating a conference or a convenor endpoint device for adding an additional endpoint device to the conference), and an enhanced MMS 102 are present. The hardware structure of such an enhanced endpoint device was described in conjunction with FIGS. 1 and 3 (above). These enhanced endpoint devices are enhanced in the sense that they are adapted to implement the series of steps set forth in FIGS. 7-9, to be described hereinafter.

Figure 4:
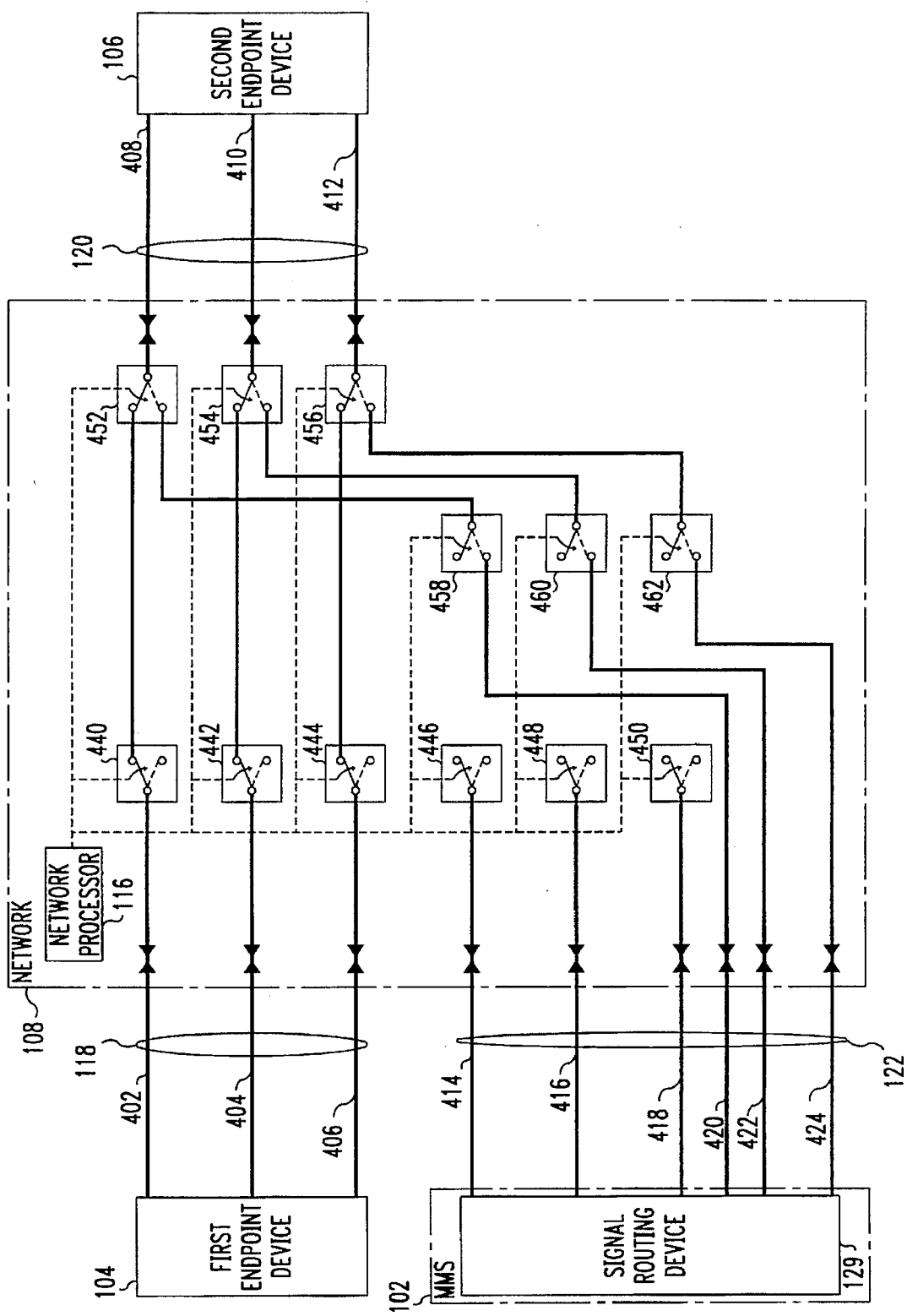
FIG. 4 is a hardware block diagram setting forth the system topology of network 108 in the context of multimedia signals.

FIG. 4 demonstrates the manner in which a conventional network 108 may be adapted for multimedia conferencing applications through the use of a MMS 102. In the example of FIG. 4, network 108 is a conventional central switching office at a local telephone company. The network 108 was designed for the purpose of carrying voice communications over point-to-point links and includes a plurality of communication pathways such as lines 402-424 for this purpose. However, these lines 402-424 may be grouped together to carry information, such as video and data, in addition to voice. Although network 108 is described as a central switching office, this is done for illustrative purposes, it being understood that the network could be another type of existing network, such as a LAN, an ATM cell switch, etc.

First endpoint device 104 is connected to network 108 via communications link 118, which contains a video line 402, an audio line 404, and a control/data link 406. (In actuality, video line 402 could represent several conventional wire pairs, whereas audio line 404 may only include one conventional wire pair.) Video line 402 connects to switch 440 in network 108. Audio line 404 connects to switch 442, and control/data line 406 connects to switch 444.

Second endpoint device 106 is connected to network 108 via communications link 120, which contains video line 408, audio link 410, and control/data line 412. Video line 408 connects to switch 452, audio line 410 connects to switch 454, and control/data line connects to switch 456.

Signal routing device 129 of MMS 102 is connected to network 108 via communications link 122. This communications link 122 includes a plurality of video lines 414, 420, a plurality of audio lines 416, 422, and a plurality of control/data lines 418, 424. Video line 414 connects to switch 446 in network 108, audio line 416 connects to switch 448, control/data line 418 connects to switch 450, video line 420 connects to switch 458, audio line 422 connects to switch 460, and control/data line 424 connects to switch 462.

The switches 440-462 of network 108 are under the control of network processor 116, which may be a conventional microprocessor device known to those skilled in the art. The network processor 116 controls the operation of each switch 440-462, and selectively connects and/or disconnects a given switch (i.e., switch 440) to/from another switch (i.e., switch 452). The circuit topology of network 108 with respect to switches 440-462 is shown for illustrative purposes only, it being understood that network 108 may include any switching topology equipped to selectively connect and/or disconnect a plurality of communication links.

Figure 5:
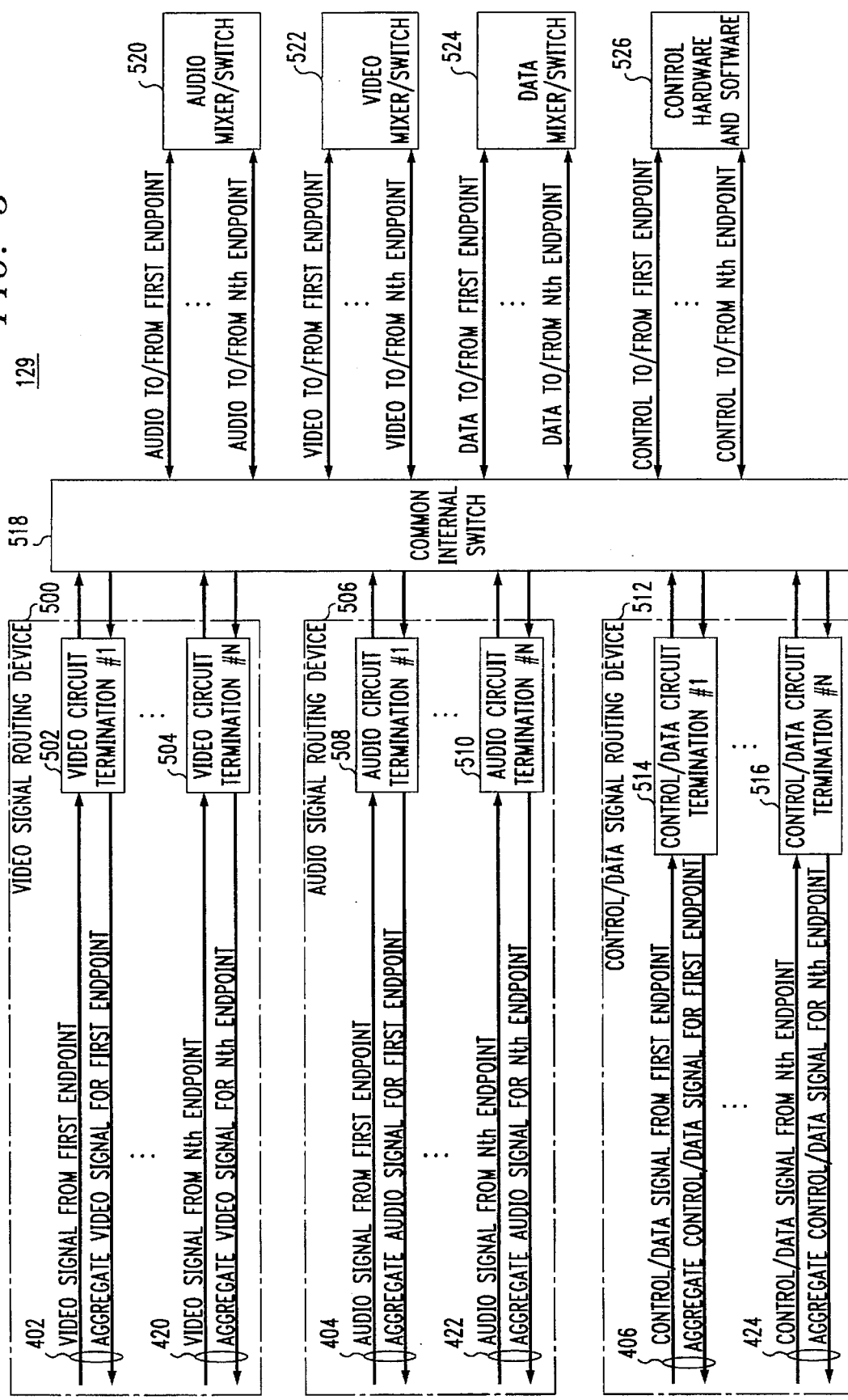
FIG. 5 is a hardware block diagram of a multimedia signal routing device for use in the MMS (102) of FIG. 1 wherein each of the individual media (i.e., video, audio, data) is carried over a separate communications link from the MMS to an endpoint device.

Refer now to FIG. 5, which sets forth the hardware configuration for the signal routing device 129 of MMS 102 (FIGS. 1 and 4). Signal routing device 129 provides for the bidirectional switching and mixing of a plurality of electronic multimedia signals to/from a plurality of endpoint devices 104, 106 (FIG. 1). The signal routing device of FIG. 5 is designed to process video, audio, and control/data signals separately. However, signal processing device 129 could alternatively be designed to process these signals in a multiplexed manner. The signal routing device 129 of FIG. 5 interfaces with each endpoint device 104, 106 via network 108 (FIG. 1). Signal routing device 129 includes three signal routing entities: an audio signal routing device 506, a video signal routing device 500, and a control/data signal routing device 512. With respect to audio signal routing device 506, an electronic multimedia signal representing audio from first endpoint device 104 is coupled to audio line 404 through network 108. An aggregate audio signal representing audio to first endpoint device 104 is also coupled to audio line 404 through network 108. Audio line 404 interfaces with audio circuit termination #1 (508), which is equipped to buffer, switch and/or amplify audio signals.

In a manner analogous to that of audio signal routing device 506, video signal routing device 500 selectively routes electronic multimedia signals among a plurality of endpoint devices 104, 106 (FIG. 1). Video signals to and from first endpoint device 104 are coupled to video line 402 via network 108. Video line 402 interfaces with a first video circuit termination #1 (502), which buffers, amplifies and/or switches video signals. Similarly, control/data line 406 handles control/data signals to and from first endpoint device 104. This control/data line is coupled to control/data circuit termination #1 (514), which buffers, amplifies, and/or switches control/data signals.

Signals from additional endpoint devices, i.e., from an Nth endpoint device, are routed in a manner analogous to that described above for first endpoint device 104. For example, audio to and from the Nth endpoint device traverses audio line 422, video to and from the Nth endpoint device traverses video line 420, and control/data signals to and from the Nth endpoint device traverse control/data line 424. Audio line 422 is coupled to audio circuit termination #N (510), video line 420 is coupled to video circuit termination #N (504), and control/data line is coupled to control/data circuit termination #N (516).

Audio circuit termination #1 (508), audio circuit termination #N (510), video circuit termination #1 (502), video circuit termination #N (504), control/data circuit termination #1 (514), and control/data circuit termination #N (516) are all coupled to a common internal switch 518 equipped to switch, buffer, and/or amplify multimedia electronic signals. The common internal switch 518 is equipped to independently process a plurality of multimedia electronic signal types. For instance, electronic signals representing audio information are processed using a set of audio switches, signals representing video information are processed using a set of video switches, and signals representing control/data are processed using a set of control/data switches.

Common internal switch 518 is coupled to an audio mixer/switch 520, a video mixer/switch 522, a data mixer/switch 524, and control hardware equipped with control software 526. Audio mixer/switch 520 mixes and switches audio to and from all endpoint devices, video mixer/switch 522 mixes and switches video to and from all endpoint devices, and data mixer/switch 524 mixes and switches data to and from all endpoint devices. Control hardware and software 526 includes a microprocessor and memory adapted to execute the control software. This control software controls the operation of the switches within common internal switch 518.

Figure 6:
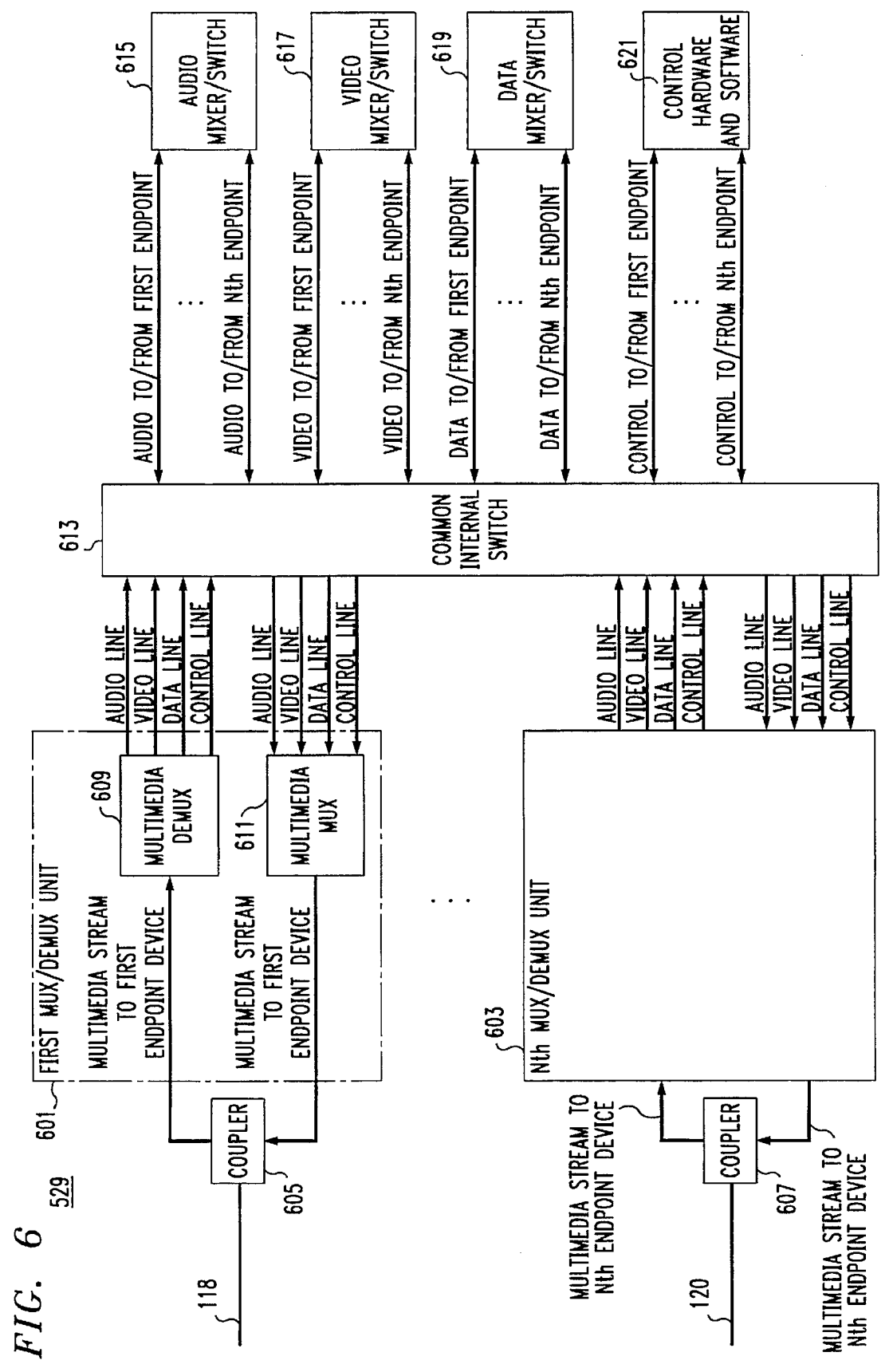

FIG. 6 sets forth an alternate embodiment of the hardware configuration for the signal routing device 129 of MMS 102 (FIGS. 1 and 4). Note that the signal routing device 129 described in FIG. 5 utilizes discrete processing circuitry for video, audio, and control/data signals, such that each type of signal is processed by a separate group of circuits at the point where the signal routing device 129 interfaces with endpoint devices 104, 106. By contrast, the signal routing device 529 of FIG. 6 is designed to process all video, audio and control/data signals to and from a particular endpoint device over a single communications link, wherein the video, audio, and control/data signals are communicated in a multiplexed manner according to any of the existing multimedia communications protocols known to those skilled in the art. The signal routing device 529 of FIG. 6 may be employed as an alternative to the signal routing device 129 of FIG. 5 in the hardware configuration of FIG. 1 as "signal routing device 129." Endpoint device 104 (FIG. 1) communicates with signal routing device 529 over communications link 118, and endpoint device 106 (FIG. 1) communicates with signal routing device 529 over communications link 120. Signal routing device 529 utilizes a coupler 605, 607 at each communications link 118, 120, respectively, for the purpose of separating multimedia signals according to the direction in which these signals traverse communications links 118, 120. For instance, coupler 605 separates multimedia signals transmitted from endpoint device 104 (and destined for signal routing device 529), from multimedia signals transmitted by other endpoint devices 106 and destined to be received by endpoint device 104. Therefore, couplers 605, 607 are three-port devices which separate a bidirectional multimedia signal stream presented at a first port into an outgoing multimedia signal stream at a second port and an incoming multimedia signal stream at a third port.

The incoming multimedia signal stream from coupler 605 is routed to a multimedia demultiplexer (DEMUX) 609, and the outgoing multimedia stream from coupler 605 is routed to a multimedia multiplexer (MUX) 611. Taken together, MUX 611 and DEMUX 609 comprise a first MUX/DEMUX unit 601. Multimedia DEMUX 609 separates the incoming multimedia signal stream into four components: a first component comprising electronic signals representing audio, a second component comprising electronic signals representing video, a third component comprising electronic signals representing data, and a fourth component comprising electronic signals representing control. Multimedia MUX 611 accepts a plurality of incoming multimedia signal components, such as a first component representing audio, a second component representing video, a third component representing data, and a fourth component representing control. The MUX 611 integrates these four components onto a single multimedia signal stream. These four components are fed to MUX 611 from a common internal switch 613. Likewise, DEMUX 609 feeds these four signal components into the common internal switch 613. Common internal switch 613 contains a plurality of electronic switches, buffers, and amplifiers under the control of control hardware and software 621. Control hardware and software 621 includes a microprocessor and memory. Common internal switch 613 is coupled to an audio mixer/switch 615 for mixing and switching electronic signals representing audio; common internal switch 613 is also coupled to a video mixer/switch 617 and a data mixer/switch 619 for mixing and switching electronic signals representing video and data, respectively.

MMS Reservation System

Figure 7:
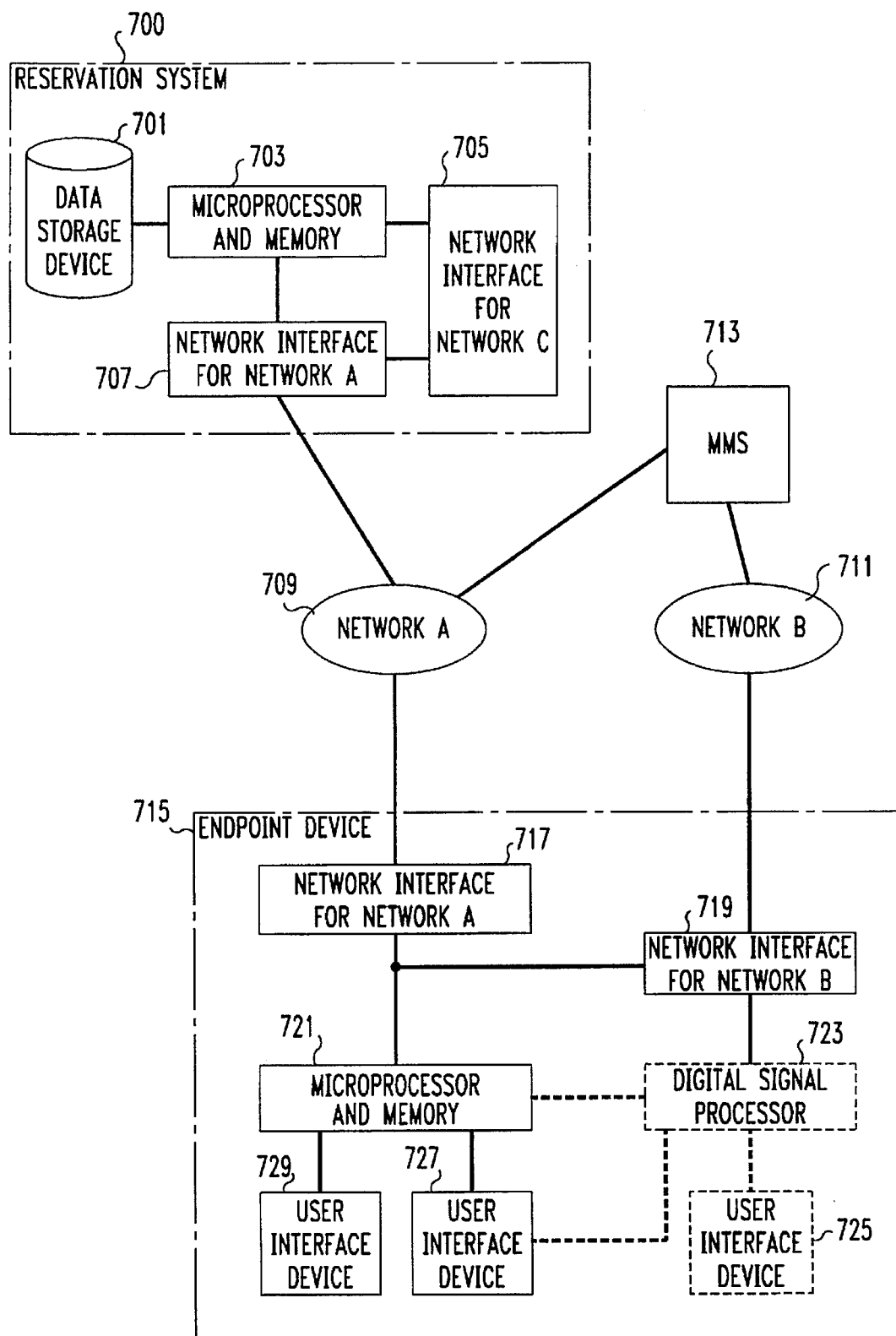
FIG. 7 is a hardware block diagram showing a multimedia conferencing system which utilizes a reservation system for bridging multimedia signals.
Figure 8A:
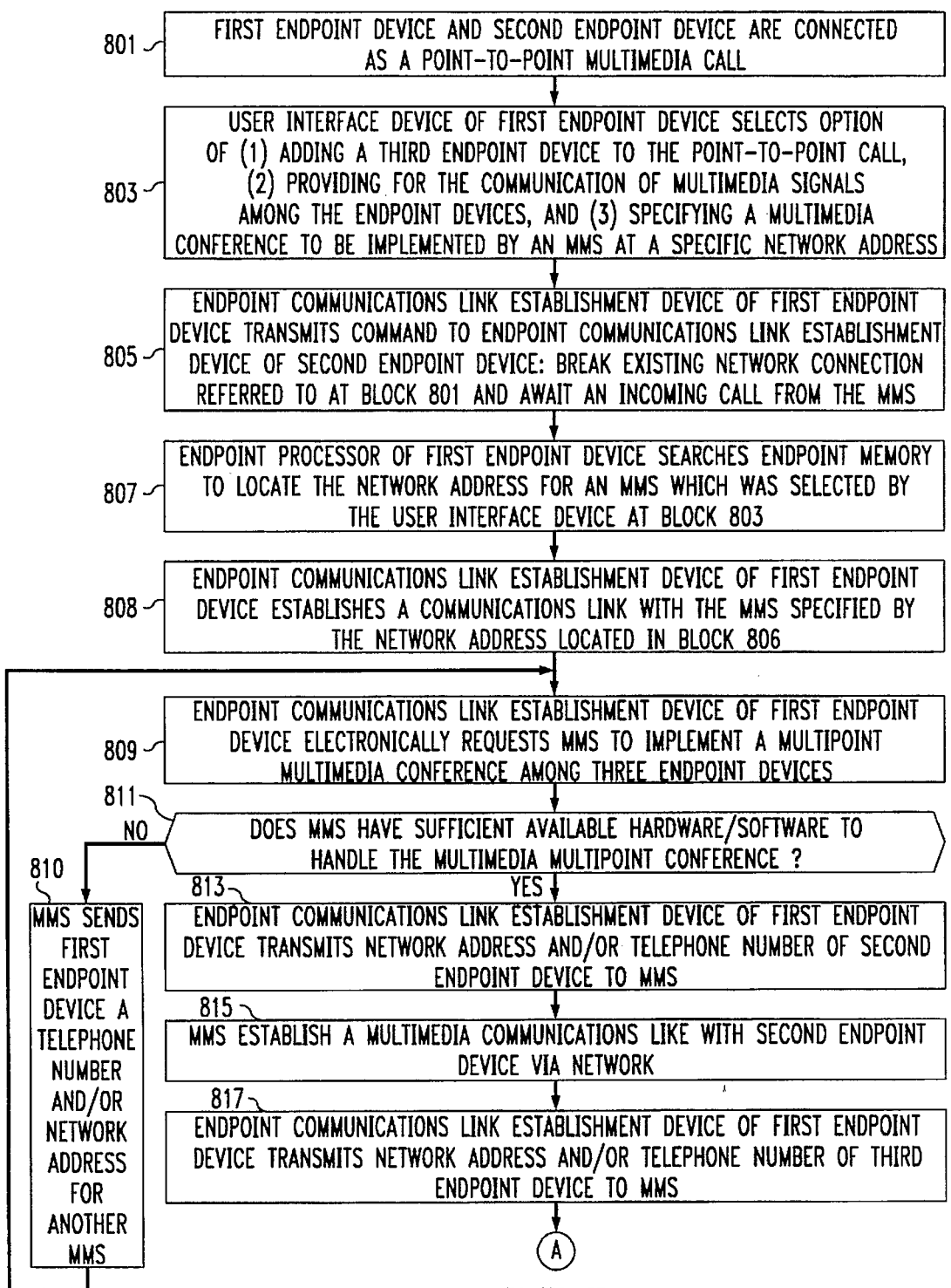
FIGS. 8A and 8B comprise a flowchart setting forth the procedure whereby an endpoint device transitions a multimedia conference call from a point-to-point conference call to a multipoint conference call.
Figure 8B:
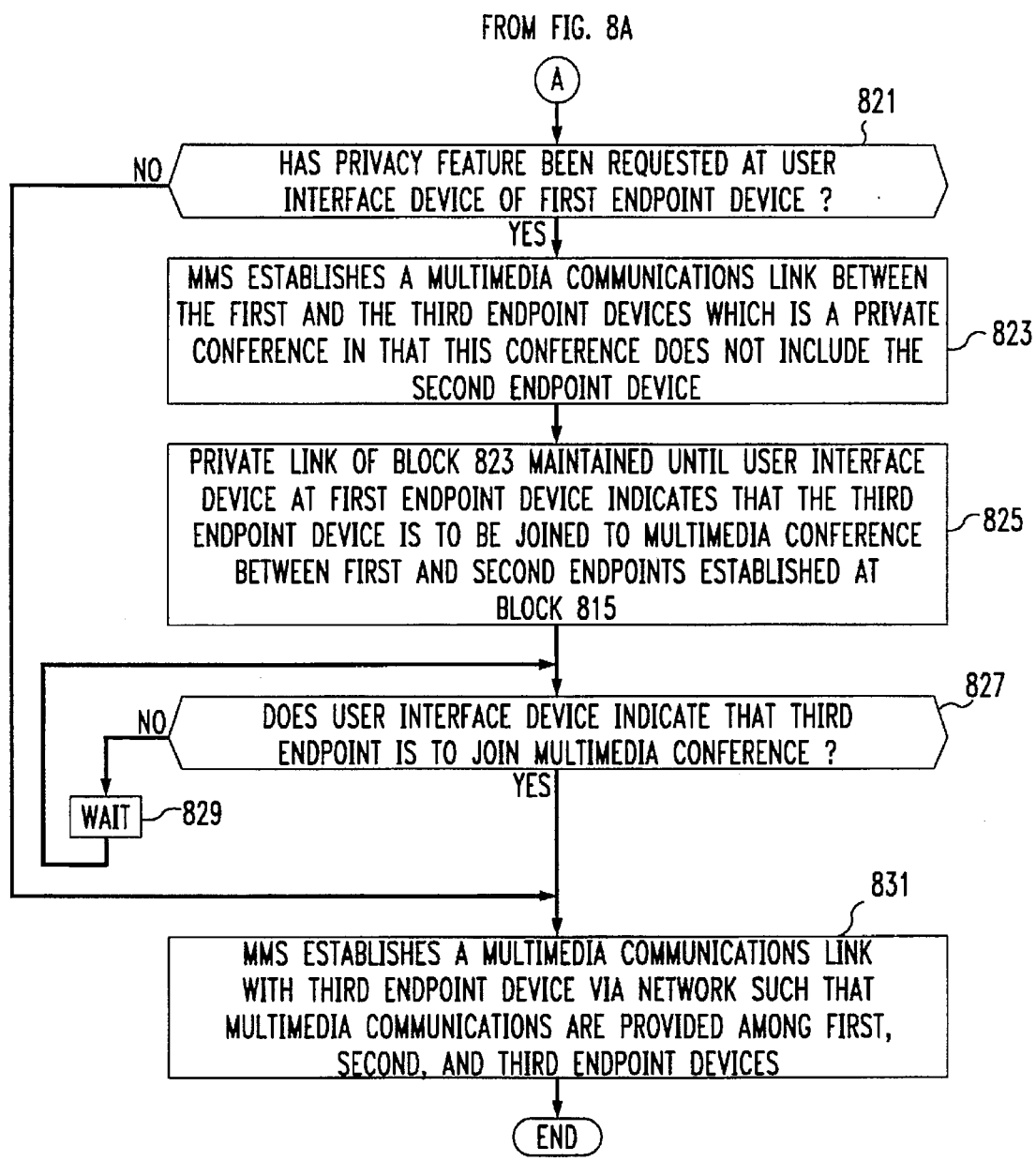

With reference to FIG. 7, the MMS reservation system 700 is a computer-based device that communicates over a communications network, such as network A 709, to MMS 713 and to endpoint device 715. The reservation system 700 includes one or more network interfaces, such as network interface for network A 707, and network interface for network C 705, which may be used to communicate with MMS 713. In addition to providing a communications protocol interface between network A 709 and reservation system 700, the network interface for network A 707 is responsive to endpoint device 715 requests for MMS 102 resources. Reservation system 700 also includes a microprocessor and memory 703 which issues requests for required information to the endpoint devices, confirms the availability of MMS 102 resources by checking against a database of previous MMS reservations, and responds to endpoint device 715 with access codes and network identifiers as needed stored in a data storage device 701.

Note that MMS 713 may be coupled to a plurality of networks, including network A 709 and network B 711. Endpoint device 715 may be equipped to communicate over a plurality of networks via a network interface for network A 717, and a network interface for network B 719. The endpoint device includes a microprocessor and memory 721, and an optional digital signal processor (DSP) 723 for terminating various multimedia communications protocols. A plurality of user interface devices 725, 727, 729 are provided, and are coupled to microprocessor and memory 721 or DSP 723. User interface devices 725, 727, 729 may include, for example, a mouse or tablet, a touch-sensitive screen, a CRT, or LCD display, or the like. Bellcore GR-1337-CORE describes an illustrative example of a reservation system 700. Examples of such systems include the AT&T CRS (Conference Reservation System), and CONVENE. Note: Although FIG. 7 refers to network A, network C and network B, network A, network C and network B could, but need not, refer to the same network.

Figure 9:
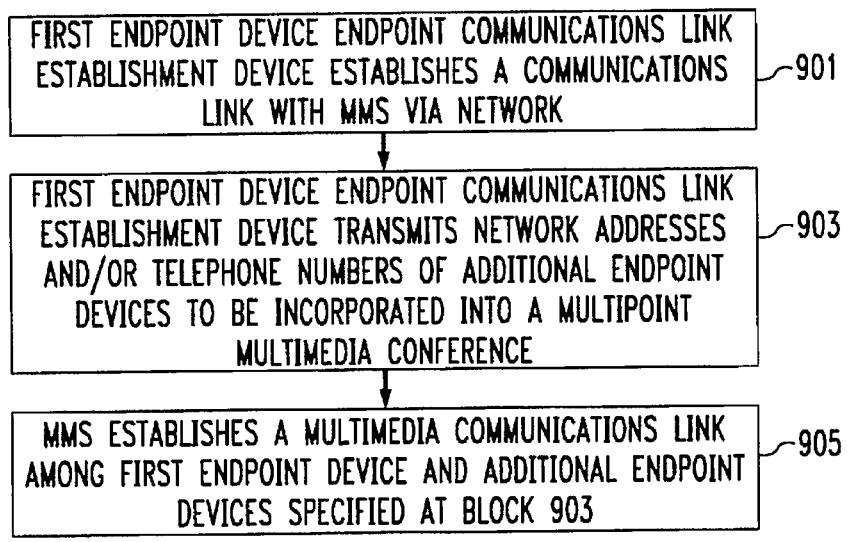
FIGS. 9–11 are flowcharts setting forth various alternate embodiments for implementing multipoint, multimedia conferences.
Figure 10:
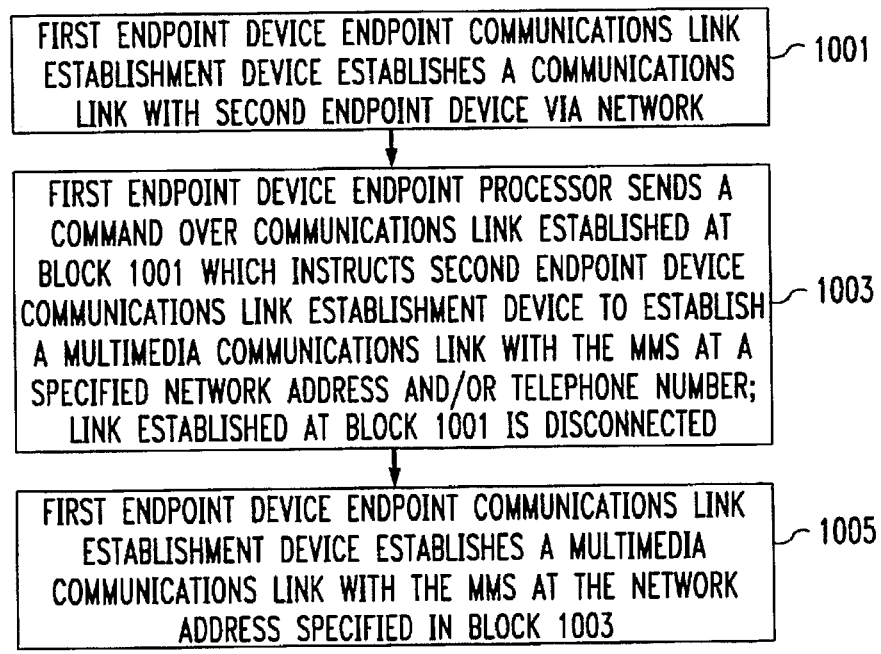
Figure 11:
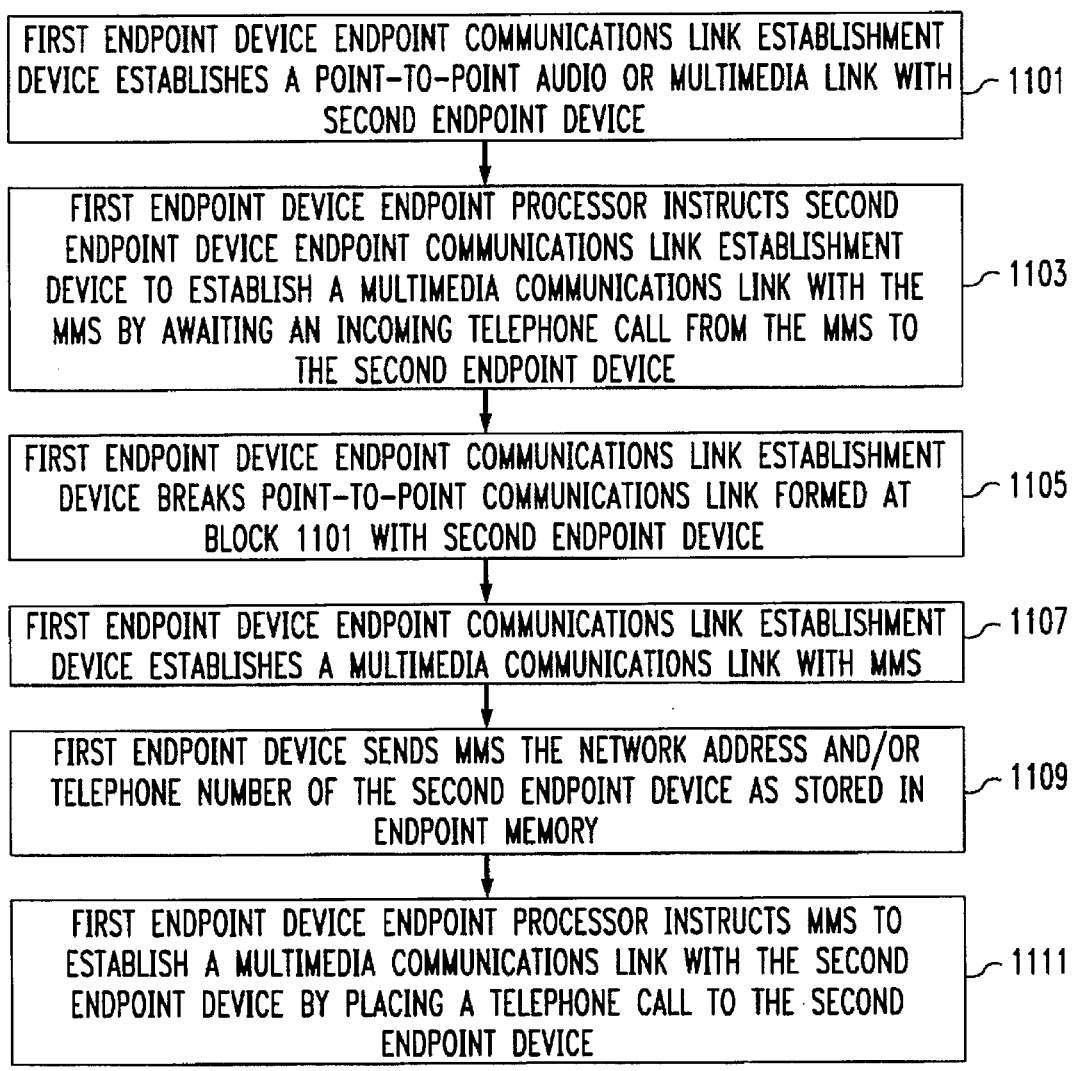

The apparatus and method of the present invention involves the use of an existing network 108, enhanced endpoint devices 104, 106, and an enhanced Multimedia Server (MMS) 102 (FIG. 1). The invention provides improved multipoint call setup and seamless transition from a point-to-point call to a multipoint conference, as will be described with reference to FIGS. 7–9. The flowcharts of FIGS. 8–9 are based upon the utilization of a system such as that of FIG. 1, wherein a first party, a second party, and a third party are all equipped with endpoint devices as shown in FIG. 1. The parties have access through the network 108 to each other, and also are able to access a Multimedia Server (MMS) and an MMS reservation system.

Several different alternate embodiments may be utilized to implement a conference call in accordance with the principles of the invention, as will be described with reference to FIGS. 8–11. According to a first embodiment of the invention, as set forth in the flowchart of FIGS. 8A and 8B, the first endpoint device 104 and second endpoint device 106 (FIG. 1) are connected via network 108 as a conventional point-to-point audio only call or as a point-to-point multimedia call (block 801). Next, at block 803, the user interface device 105 of first endpoint device 104 (FIG. 1) selects an option of (1) adding a third endpoint device to the point-to-point call, (2) providing for the communication of multimedia signals among the endpoint devices, and (3) specifying a multimedia conference to be implemented by an MMS at a specific network address (block 803). At block 805, endpoint communications link establishment device 134 of first endpoint device (FIG. 1) transmits a command to the endpoint communications link establishment device of the second endpoint device 136 to break existing network connection referred to at block 801 and await an incoming call from the MMS 102.

At block 807, the endpoint processor 142 of first endpoint device 104 searches endpoint memory 146 to locate the network address for an MMS 102 which was selected by the user interface device at block 803. At block 808, the endpoint communications link establishment device 134 of first endpoint device 104 establishes a communications link with the MMS 102 specified by the network address located in block 806. Next, at block 809, the endpoint communications link establishment device 134 of first endpoint device 104 electronically requests MMS 102 to implement a multipoint, multimedia conference among three endpoint devices.

A test is performed at block 811 to ascertain: Does MMS 102 have sufficient available hardware/software to handle the multimedia, multipoint conference? The affirmative branch from block 811 leads to block 813, and the negative branch from block 811 loops back to block 810. At block 810, the MMS 102 sends first endpoint device 104 a telephone number and/or network address for another MMS. Program control then loops back to block 809. The affirmative branch from block 811 leads to block 813, where endpoint communications link establishment device 134 of first endpoint device 104 transmits network address and/or telephone number of second endpoint device 106 to the MMS 102. At block 815, the MMS 102 establishes a multimedia communications link with second endpoint device 106 via network 108. At block 817, the endpoint communications link establishment device 134 of first endpoint device 104 transmits the network address and/or telephone number of a third endpoint device to the MMS 102.

At block 821, a test is performed to see whether the privacy feature has been requested at the user interface device 105 of the first endpoint device 104. The privacy feature operates by providing a separate, private communications link between an endpoint device which is about to be incorporated into an existing multimedia conference and an endpoint device which has already been incorporated into this conference and is being used to bring the additional endpoint device into this conference. The affirmative branch from block 821 leads to block 823, whereas the negative branch from block 821 results in transfer of program control to block 831.

At block 823, the MMS 102 establishes a multimedia communications link comprising a conference between the first and the third endpoint devices which link is a private link in that it does not include the second endpoint device 106.

At block 825, the private link of block 823 is maintained until user interface device at first endpoint device 134 indicates that third endpoint device is to be joined to the multimedia conference between first and second endpoints 104, 106 which was established at block 815. Next, a decision is performed at block 827: Does user interface device 105 indicate that the third endpoint is to join multimedia conference? The affirmative branch from block 827 leads to block 831 and the negative branch from block 827 leads to block 829. At block 829, the program waits for a predetermined interval (i.e., a few seconds), and program control loops back to block 825. The affirmative branch from block 827 leads to block 831, where the MMS 102 establishes a multimedia communications link with third endpoint device via network 108 such that multimedia communications are provided among first, second, and third endpoint devices.

According to a alternate first embodiment, the initiating endpoint device such as, for example, first endpoint device 104 contacts the MMS 102 (block 901), and then informs the MMS (for example, using in-band signalling) of the network addresses of additional endpoint devices 104, 106 (block 903). The MMS 102 then connects to those endpoint devices 104, 106 (block 905). This procedure has the advantage of working in the case where only the first (initiating) endpoint device 104 and the MMS 102 have been enhanced. (Enhanced endpoint devices are endpoint devices including the elements shown in FIG. 1 and adapted to execute the series of steps described in FIGS. 8–11, to be described hereinafter.) In a second alternate embodiment, described in the flowchart of FIG. 10, the first (initiating) endpoint device 104 contacts a receiving endpoint device 106 (block 1001), and requests the second (receiving) endpoint device 106 to place a call to the MMS 102 at a network address it provides (block 1003). The first endpoint (104) drops the call to the second endpoint (106). Then, the first (initiating) endpoint device 104 calls the MMS 102 (block 1005). This method of operation typically results in network billing being split more evenly between the initiator and the receiver of the call.

After this point, irrespective of the method of conference implementation actually utilized, the addition of subsequent endpoint devices to the conference may proceed as described above in connection with the first, second, or third embodiments, with a private conference being formed as each endpoint device is incorporated into the conference. Endpoint devices 104, 106 cooperating with each other and with the MMS 102 shield users from any direct interactions with a reservation system or the MMS 102, or from any perception of call disconnection or setup during the conference establishment process.

A more detailed embodiment is described hereinafter where the endpoint device 104 is PC-based. A user interface is described using constructs that are well known by a practitioner skilled in the art. This user interface is graphically-based and includes elements such as menus, dialog boxes, scroll boxes, command boxes, message boxes and text boxes. Two scenarios are described—the first describes improved multipoint call setup, and the second describes the seamless transition from a point-to-point to multipoint conference.

In this scenario the endpoint user may place a call by selecting a "Call" menu item from a main menu bar on the video window in a windows-based environment. This would bring up a dialog box that presents a directory of parties to call in a scrolling list box. The user then selects a party to call and then selects a "Call" command button. The user may choose to call another multimedia endpoint or the MMS. If the user chooses to call the MMS, the normal procedure is followed for connecting a multimedia endpoint to an MMS. After connecting to the MMS, the user may choose to call another party by selecting an "Add Party" item from the main menu. A dialog box would pop up and the user could select a party from a directory of other endpoints or enter the telephone number(s) directly using the PC keyboard and/or via the endpoint's menus and dialog boxes.

In the flowcharts of FIGS. 8–11, upon receipt of a call from a conference-initiating endpoint, the MMS creates a conference. The MMS 102 (FIG. 1) has no knowledge if the initiator was previously on a point-to-point call and is adding a 3rd party, or if the initiator is just beginning a conference. At this point, extensions to the multimedia protocol (for example, the MBE NIA message described above) are used by the initiator's endpoint device to transfer the telephone numbers of the party to be added to the conference to the MMS 102. The MMS is enhanced to decode the above-described extensions to the protocol and to initiate a dial-out call to the new party. Further, the status of the dial-out call is passed back to the initiator's endpoint which presents messages indicating that the call is currently being dialed, is ringing, is busy, etc. The MMS first determines if there are enough resources (communication ports which link to network 108) to handle the new party, and if not, the MMS sends a status message to the initiating endpoint to that effect.

There are two points at which the MMS evaluates its resources to see if it can accommodate a conferencing request. First, after receiving the initial "begin conference" request, and again when receiving a request to add another party to the conference. Upon receipt of the initial conference request, the MMS may go through the steps described in FIGS. 8–11. The resources checked by the MMS can include availability of communication links (122), availability of shared service circuits (such as the link establishment devices [132] and data transceivers [130]) or data memory (128).

If the MMS determines there are insufficient resources to handle the initial conference setup, it may download a network address corresponding to an alternate MMS to the endpoint device from which a conference is being initiated, or the MMS may download an indication that the conference cannot be handled at this time.

The handling of resource shortage when adding a party can be different from how it is handled during initial conference setup. In this case, the MMS may choose to set up a cascade (as described in ITU-T H.243) to another MMS to allow for the growth of the conference.

As an option, the initiator can choose to have a private conversation with the new party before the party is added to the conference. The initiator selects an option on the endpoint which is sent to the MMS. If privacy is chosen, the MMS will split the conference into two subconferences: one containing the initiator and the new party, and one containing all other parties. After the new party has agreed to join the conference, the initiator will send a message to the MMS indicating such. The MMS will then join the two subconferences into one conference.

With respect to block 821 (FIGS. 8A and 8B), there are many different methods an MMS 102 (FIG. 1) can use to implement the privacy feature. Two methods will be provided here:

1. Method 1 (simple): Disconnect audio/video to/from all other endpoints in the conference except the endpoint trying to add the new party (initiator's endpoint). This procedure can be implemented by turning off a "listen/send" variable transmitted to the endpoints. When a "join" message is received, the audio/video to/from these endpoints will be returned, by internally turning on listen/send to the endpoints; all parties can now see/hear each other. 2. Method 2 (telephone-like): Create 2 sub-conferences, one (1) for the party initiator trying to add another party to the conference, and one (2) for all other parties in the conference. All parties in sub-conference 2 can see/hear each other, but they cannot see/hear the initiator or the new party. When the new party is added, it is added to conference 1 and can see/hear only the initiator. After the "join" message is received, subconferences 1 and 2 are joined together; all parties can now see/hear each other. Any endpoint processor 142 equipped to send messages and/or commands to the MMS processor 126 can create a conference, as well as add and delete other parties.

The MMS will allocate and deallocate its resources dynamically, as parties are added and dropped from the conference. Upon completion of the conference, the MMS will delete its record of the conference, and all resources are immediately available to be used in another progressive multimedia conference.

In this next scenario, a seamless transition from a point-to-point call to a multipoint conference is described. Similar to the previous scenario, the user of the multimedia endpoint is presented with a screen that includes a window for the conferenced video; menus, and dialog boxes for controlling the conference; and indications of the status of the conference.

The user places a call by selecting a "Call" menu item from the main menu bar on the video window. This brings up a dialog box that presents a directory of parties to call in a scrolling list box. The user selects a party to call and then selects the "Call" command button.

After the user chooses to call another party, the normal procedure is followed for connecting one multimedia endpoint to another.

After connecting to the other party, the user may choose to add another party to the conference by selecting the party from the directory or entering the telephone number(s) in directly via the endpoint's user interface device, such as a keyboard, menus, and/or dialog boxes. At this point, the endpoint uses an extension to the multimedia protocol to pass an indication to the second party that the MMS or conferencing service will be calling the second party. The second party's endpoint will then indicate to its user that it is awaiting a call from the MMS. The initiator's endpoint similarly displays a message to its user that it is connecting to the MMS. The initiator's endpoint then drops the point-to-point call, calls the MMS (which is capable of progressively adding parties to a conference without pre-arranged reservations), and instructs the MMS to dial the second party. Additional parties can now be added to the conference.

Partitioning of the Conferencing Functions

Multipoint call setup and transition from point-to-point to multipoint can be accomplished by partitioning the functions described either more to the MMS or more to the endpoint. That is, transition from a point-to-point call to a multipoint call could be handled completely by an enhanced endpoint without any assistance from an enhanced MMS. In that case, the enhanced endpoint could contact the MMS reservation system, arrange a multipoint conference, and pass the required dial-in (meet-me) telephone numbers to Party 1. However, by partitioning the functions between an enhanced endpoint and an enhanced MMS, the service presented to the user operates more smoothly and efficiently, with enhanced feedback to the user.

We claim:

1. A method for implementing a multimedia conference in a system comprising
   i) a network including a plurality of network communications links, each network communications link being associated with a network address;
   ii) a multimedia server (MMS) coupled to the network and comprising
      a) multimedia bridge means for mixing and switching multimedia electronic signals representing audio, video, data, and control among a plurality of endpoint devices through the network;
      b) MMS communications link establishment means for establishing multimedia communications links on the network;
      c) MMS network address transceiver for transmitting and receiving network addresses over the network;

d) processing means comprising a microprocessor; and
e) memory means;

iii) a plurality of endpoint devices, including a first and a second endpoint device, each endpoint device comprising a) user interface means for accepting input from a user and for providing multimedia output to a user, the multimedia output including at least one of audio, video, and data;

b) endpoint communications link establishment means for establishing communications links on the network;

c) an endpoint network address transceiver for transmitting and receiving network addresses over the network;

d) processing means including a microprocessor; and
e) memory means;

THE METHOD INCLUDING THE STEPS OF:

a) the network assigning the MMS an MMS network address uniquely specifying a particular MMS; and b) programming the MMS network address into the memory means of at least one of the plurality of endpoint devices.

2. A method for implementing a multimedia conference as set forth in claim 1 further including the steps of:

a) uploading the MMS network address from the memory means of the first endpoint device to the endpoint communications link establishment means of the first endpoint device;

b) the endpoint communications link establishment means of the first endpoint device establishing a communications link with the MMS through the network;

c) the first endpoint device endpoint network address transceiver transmitting a network address for the second endpoint device to the MMS;

d) the communications link establishment means of the MMS establishing a multimedia communications link between the MMS and the second endpoint device; thereby providing a multimedia conference among a plurality of endpoint devices equipped to communicate electronic signals representing audio, video, and data to each of the endpoint devices.

3. A method for implementing a multimedia conference as set forth in claim 2 further including the step of repeating steps (c)-(d) for an additional endpoint device comprising a third endpoint device.

4. A method for implementing a multimedia conference as set forth in claim 3 further including the step of providing a private communications link between the first and third endpoint devices such that the second endpoint device is excluded from the private communications link, the private communications link being provided during any time interval for which the first and second endpoint devices are engaged in a multimedia conference.

5. A method for implementing a multimedia conference as set forth in claim 2 further including the steps of:

a) uploading the MMS network address from the memory means of the first endpoint device to the endpoint communications link establishment means of the first endpoint device;

b) the endpoint communications link establishment means of the first endpoint device establishing a communications link with the second endpoint device through the network;

c) the first endpoint device transmitting an indication to the second endpoint device to await a call from the MMS;

(d) the communications link established between the first and the second endpoint devices in step (b); and (e) the first endpoint device establishing a multipoint, multimedia conference, characterized in that the multipoint conference is seamless.

6. A method of implementing a multimedia conference as set forth in claim 5 where the steps of claim 5 (c) and (d) are repeated to add additional endpoint devices.

7. A method for implementing a multimedia conference as set forth in claim 6 further including the step of providing a private communications link between the first and third endpoint devices such that the second endpoint device is excluded from the private communications link, the private communications link being provided during any time interval for which the first and second endpoint devices are engaged in a multimedia conference.

* * * * *